May 27, 1958 W. W. PHARIS 2,836,659

LOCAL FIRST SELECTOR CIRCUIT

Filed April 5, 1954 5 Sheets-Sheet 1

INVENTOR.
WILLIAM W. PHARIS
BY J. Warren Whitesel
ATTORNEY

LOCAL FIRST SELECTOR CIRCUIT

Filed April 5, 1954 5 Sheets-Sheet 4

May 27, 1958 W. W. PHARIS 2,836,659

LOCAL FIRST SELECTOR CIRCUIT

Filed April 5, 1954 5 Sheets-Sheet 5

United States Patent Office 2,836,659
Patented May 27, 1958

2,836,659

LOCAL FIRST SELECTOR CIRCUIT

William W. Pharis, Rochester, N. Y., assignor, by mesne assignments, to General Dynamics Corporation, a corporation of Delaware Application April 5, 1954, Serial No. 420,778

8 Claims. (Cl. 179—18)

This invention relates to electro-mechanical telephone systems and more particularly to a local first selector which is adapted for use in a telephone system.

For a long period of time, telephone systems have been adapted to use an office name and four digits to identify a subscriber line. In dial systems, it was conventional to dial the first two letters in the office name followed by the four subscriber line identification digits—or stated otherwise, a six digit code. In large metropolitan telephone exchanges, this scheme was superseded by a seven digit code; however, it was not until recently that smaller type exchanges have been forced to seven digit codes as a result of growth and the preparation for intertoll dialing. Therefore, the trend in many of the smaller offices is to seven digit codes wherein the first three are office selecting digits and the last four are line selecting digits. Conventionally, the first two office selecting digits are the first two letters of the office name and the third office selecting digit is a numerical designation. This new numbering system requires new local first selectors which are able to absorb selectively various ones of the office selecting digits as required by new trunking schemes. It is desirable to make these digit absorbing selectors as flexible as possible so that they may be used in various offices, each of which may have a different trunking and hence numbering scheme.

One object of this invention is to provide a new and improved local first selector.

A second object of this invention is to provide a selector switch which is adapted to absorb particular digits among the office selecting indicia.

Another object of this invention is to provide a selector switch which is adapted for use in a telephone system wherein the first time that a particular level dialed, the selector drops back and thereafter the selector moves in a secondary direction on this level, when it is dialed at a later time.

A further object of this invention is to provide a selector switch which may be used in a telephone system wherein the selector moves in its secondary direction on a particular level when seized responsive to a first digit and drops back when the same level is seized responsive to another digit.

Yet another object of this invention is to provide a local first selector switch having flexibility of operation such that it may be used in a seven digit telephone system wherein the same level may either cause the switch to drop back from its primary motion to absorb digits or to move in its secondary direction on the same level depending upon the position of a particular digit in a plurality of digits.

Means for accomplishing these objects is illustrated by a system using a flat-type, step-by-step selector switch of the type sold under the trademark "XY"; although, it should be understood that other types of switches could be used without departing from the scope of my invention. This switch is usually provided with a first set of wipers that carry two voice and two control conductors. These wipers are moved, first in a primary direction and next in a secondary direction so that the switch may select between any of a hundred possible positions. The switch also has an auxiliary set of wipers that are moved simultaneously with the first set of wipers during the primary motion of the switch under the influence of subscriber transmitted digit pulses. The auxiliary wipers make contact with a set of terminals that are marked selectively in accordance with the distance that the switch moved in its primary direction. These markings may be connected through the auxiliary wipers to the selector circuit where various operations may be controlled to change the mode of switching depending upon both the digits dialed and the sequence in which the digits are dialed to control the switch motion in its primary direction.

Various optional wirings are provided which may be connected with the auxiliary bank contacts to cause the switch to drop back to normal depending upon the distance that the switch travels in the primary direction. Means is provided in the form of a plurality of counting relays so that the selector circuit may register the number and types of digit absorptions as they occur. When a sufficient number of preceding operations have been completed, the selector may utilize the next digit pulse train to seize the next rank of selecting equipment. This provides a flexibility of operation such that a number of digit pulse trains may be used or absorbed as required.

These and other objects will be obvious to those skilled in the art from the following description of the circuit in operation.

Figs. 1*a* and 1*b* show broadly a telephone system utilizing different trunking arrangements.

Figs. 2, 3 and 4 show in detail the selector shown in Figs. 1*a* and 1*b* by the hollow rectangles marked 103 and 153.

Fig. 5 shows the manner in which Figs. 2–4 should be arranged to provide a clear and understandable circuit arrangement.

In preparing these drawings, care has been used to show circuit details as clearly and concisely as possible. For example, the power source is identified by a (+) and (−) sign. As is conventional in most telephone systems, the positive (+) terminal is identified as being connected with ground. It should be understood that this or any similar arrangement could be used. Figs. 2–4 also show various disconnected elements enclosed in dotted rectangles such as overflow contacts (OF) which are operated by the switch at the extremity of its motion either in the primary or secondary direction. Various interrupter springs are shown. These springs complete or break electrical circuits under the influencce of the driving or release magnets of the switch. Both the magnets and the interrupter springs are identified by the letters "X, Y or Z." Off-normal springs are arranged to be operated by the switch when it takes its first step in either direction. The primary motion off-normal springs are identified by the letters XON while the secondary motion off-normal springs are identified by the letters YON. The various elements such as line circuit 101, line finder 102, elements 104, 107, 131, 132, line circuit 151, line finder 152 and elements 154—159 are all conventional equipment which may be used in any well-known manner; therefore, these elements are shown only by a block diagram. It should be understood that those skilled in the art may select freely between any one of many elements which are suitable for use in connection with this circuit.

A plurality of level marking wires (A, B, M, N, Q, V and Z) are provided to be connected to any desired level in the auxiliary bank of terminals or contacts X and XX. The switch may be driven to select any of these levels in its primary motion. Responsive thereto, the switch operates differently depending on how the marking wirings are connected.

*General description*

Figs. 1*a* and 1*b* show two subscribers A and H who for the purpose of this description will be considered as calling subscribers and seven other subscribers labeled B, C, D, E, F, I and J who have been illustrated as called subscribers to show several of the various options under which the selector may operate. It should be understood that these trunking arrangements are for purposes of explanation only and that other trunking diagrams could be prepared by using different combinations of the various options.

Selectors 103 and 153 are the same except that the former is provided with the C strap which interconnects contacts 413 and the N wiring, while the latter is provided with the D strap which interconnects contacts 413 and the Z wiring.

If either of the subscribers A or H wishes to call subscriber B, it is necessary to dial only one digit which may be the one that is represented by the last or zero hole on the standard dial, for example. The selector switch is driven to its tenth level marked by an M wiring responsive to which the switch cuts in to search in its secondary direction for an idle trunk, that may be connected to an operator position.

If subscriber A wishes to call subscriber C, the number AG–2–XXXX is dialed. This is the same as the digits 24–2–xxxx because the letters A and G are the same as the digits 2 and 4 on the standard dial; the digit equivalents are shown in Figs. 1*a* and 1*b* in parentheses just beneath the directory numbers. Responsive to dialing the letter A, local selector 103 is directed to the level marked by the B and V wiring. Digit count relay 260 operates and locks. The selector drops back and second digit count relay 410 operates and locks. The second letter (G) directs the switch to the level marked by the A wiring and the switch drops back. The third digit directs the switch to the level marked by the B and V wiring a second time and the selector switches through to seize second selector 105, if then idle. It should be noted that selector switch 103 drops back when directed to a B and V marked level responsive to a first digit and may switch through when directed to this same level by a later digit.

If subscriber A wishes to call subscriber D, the number AG–6–xxxx is dialed. The switch moves first to the B and V marked level and second to the A marked level. Each time the switch drops back. Relays 260 and 410 are operated and locked. The third digit directs the selector to the level marked by the Z wiring. Relay 270 operates and locks. The switch drops back and unlocks so that any digit may be effective to cause switchthrough when the subscriber dials the first line selecting digit.

When either of the calling subscribers A or H dial HX–X–XXXX to seize subscriber E's line, the selector may switch through on the first digit when the level marked by the A wiring is seized. Contrast this with the function of the A wired level in the case of a call to subscribers C or D. When the A wired level is reached responsive to a first digit, the selector may switch through; whereas, when the A wired level is reached before the switch is unlocked on other than the first digit, the switch drops back.

Calls from subscriber H are similar to those from subscriber A. In this case, the N wiring is used for digit absorption before the switch unlocks and with the D strap, the A wiring unlocks the switch when dialed after the first digit.

The Q wiring is used after drop-back responsive to a first digit for causing the selector to switchthrough without unlocking.

*Detailed description*

Figure 2:
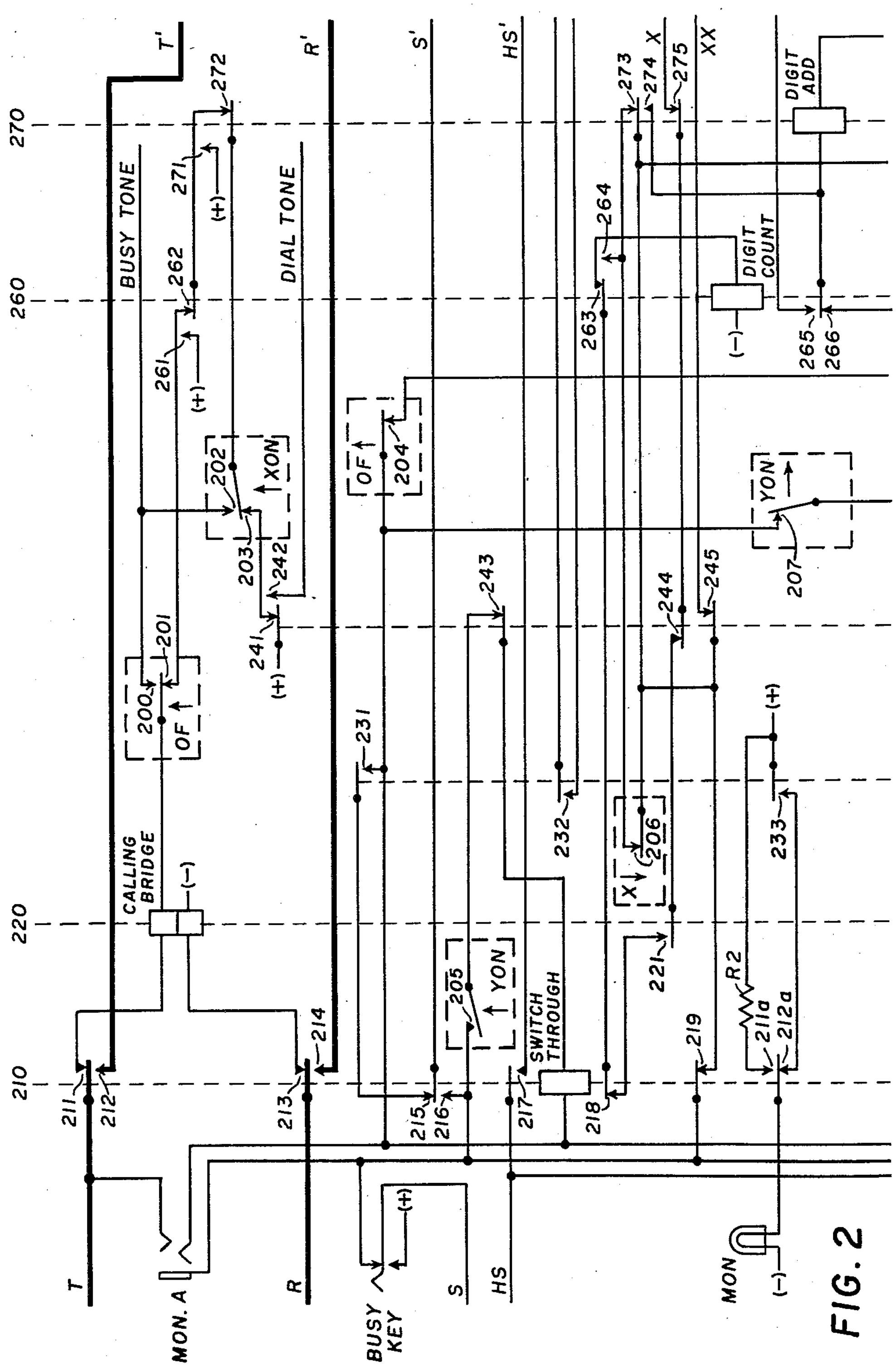
Figure 3:
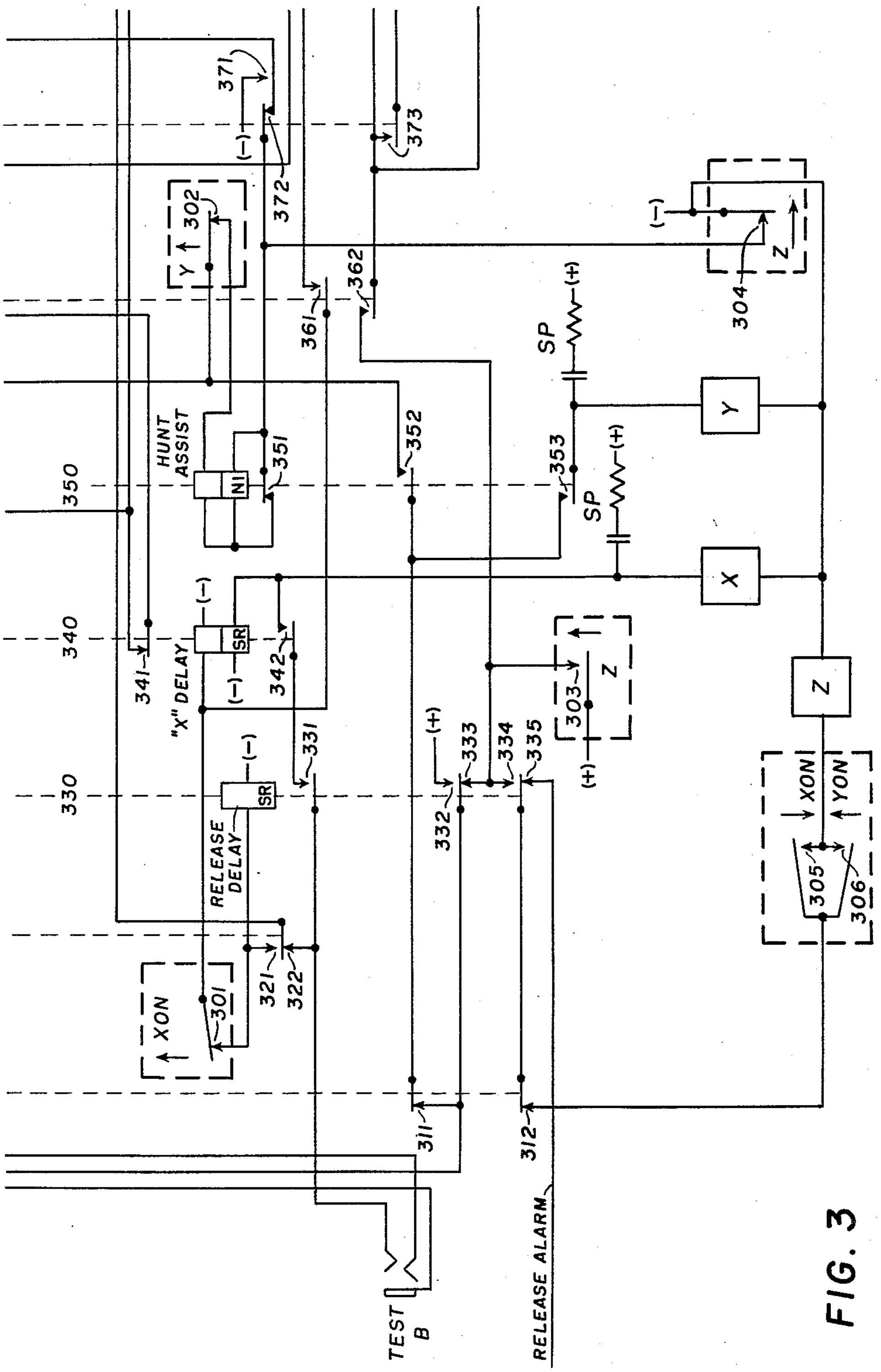
Figure 4:
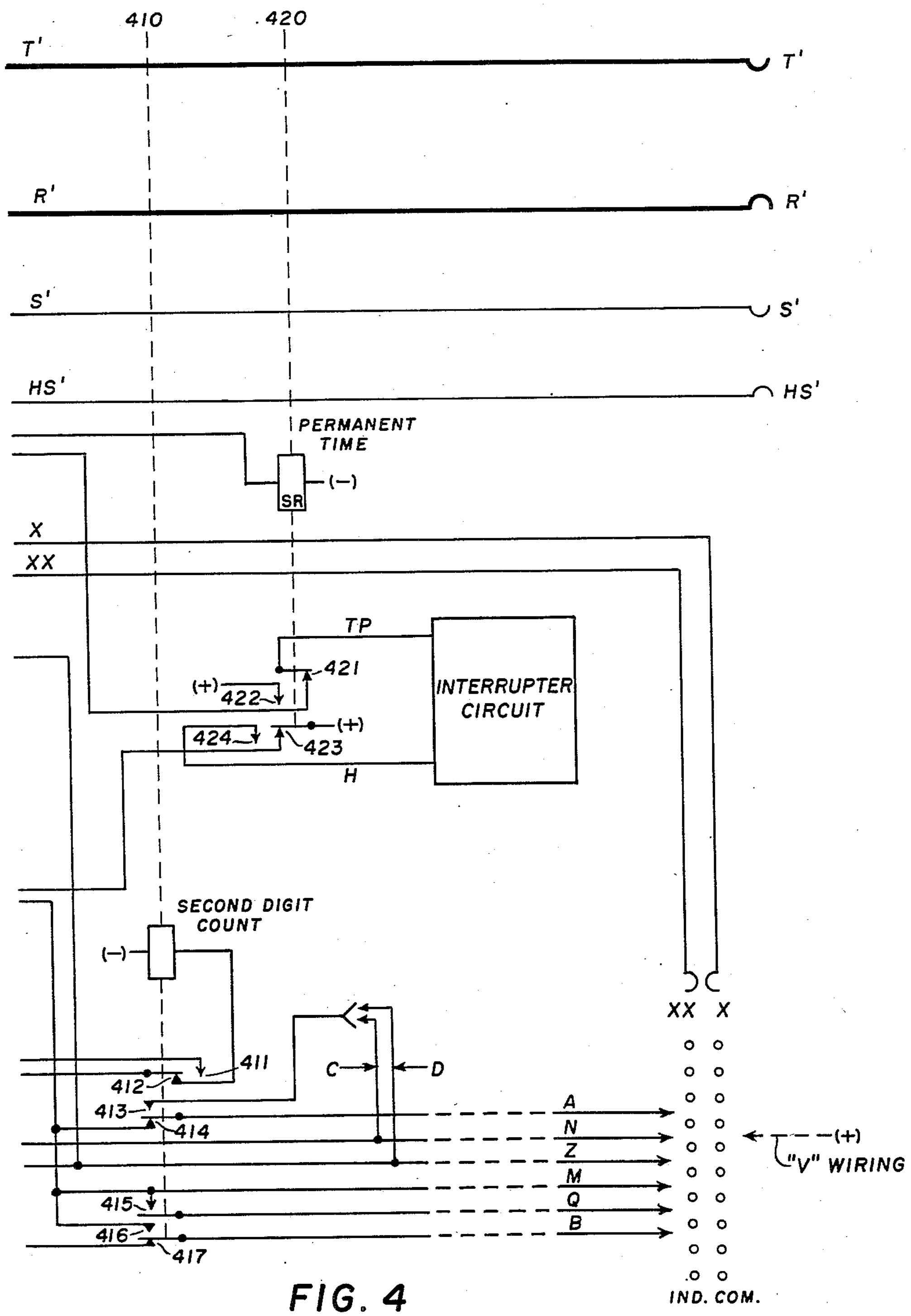

It is thought that the invention may be understood best by a detailed description of Figs. 2–4 which show the details of local first selectors 103 and 153.

*Call from subscriber A to subscriber B*

The first call to be described is one from subscriber A to subscriber B which is completed by way of zero operator 132. Since it is only necessary to dial the one digit zero to complete this call, it is to be expected that the selector switch will be prepared to switchthrough on the first digit without absorbing any preceding impulses.

To place the call, subscriber A removes his telephone receiver at the calling station to complete a loop to line circuit 101. This causes line finder 102 to hunt for and seize subscriber line A. Following this, a circuit is completed to local first selector 103 and subscriber A receives dial tone. He proceeds to transmit 10 digit pulses by means of any suitable device (not shown) such as a dial, for example. Selector 103 is directed to the 10th level marked in the auxiliary bank of contacts by an M wiring. Trunk circuits 104 and 131 are used to complete a connection to zero operator 132. Now she may speak with the calling subscriber and determines the destination of the call following which she completes a talking connection to subscriber B by means of any suitable equipment such as a simple plug and jack arrangement or by electromechanical switching equipment according to the facilities available to her.

Figures 1A, 5:
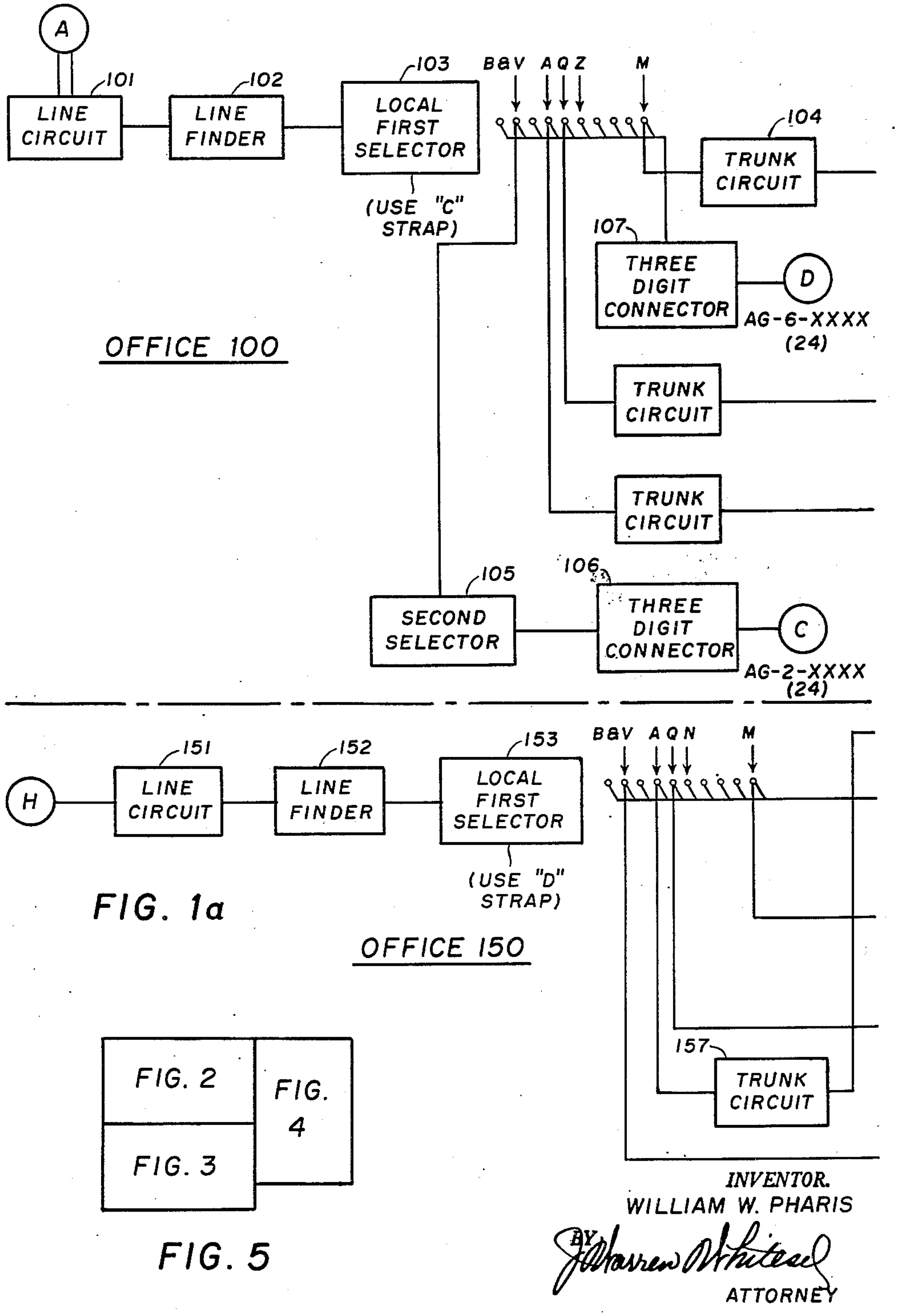
Figure 1B:
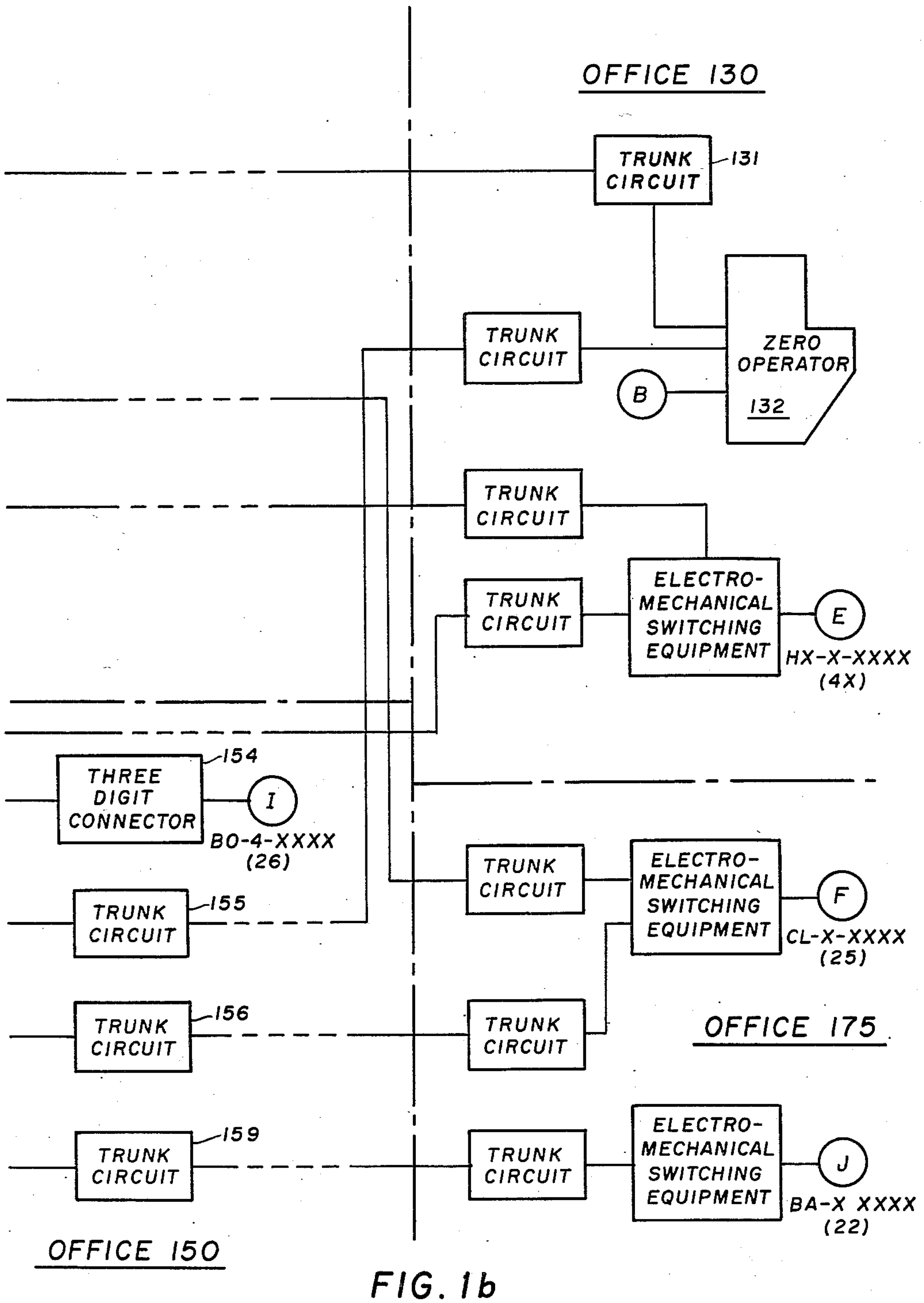

*Seizure.*—The details of local first selector 103 are shown in Figs. 2, 3, and 4 when joined in the manner shown in Fig. 5. The C strap is used to interconnect the A and N wirings and the D strap is omitted in the case of office 100 and local first selector 103.

Responsive to removing the handset at subscriber station A, the following circuit is completed to operate calling bridge relay 220: (−) battery through the lower winding of calling bridge relay 220, rest contacts 213, ring conductor R, the loop including the calling subscriber station, tip conductor T, contacts 211 and the upper winding of calling bridge relay 220 to ground (+) by way of contacts 201, 262, 272, 203 and 241. Calling bridge relay 220 is provided to respond to subscriber transmitted digit pulses and to utilize these pulses to control switch motion. Contacts 221 on calling bridge relay 220 close to prepare a circuit for digit count relay 260. Calling bridge relay 220 also closes its contacts 321 while opening contacts 322. A circuit is now completed for operating release delay relay 330 and X delay relay 340 in parallel. The energizing circuit to release delay relay 330 extends from ground (+) applied by way of rest contacts 423 on permanent time relay 420 through operated contacts 321 and the winding of release delay relay 330 to (−) battery.

Release delay relay 330 operates to hold the circuit elements during pulsing and until switchthrough or release in the case of an all trunks busy condition. At contacts 335, the circuit to the release alarm conductor is opened thereby preventing a possible premature release of the switch. Contacts 334 close to prepare a digit absorption path. Contacts 332 close to apply master ground (+) which is used to hold most relays in the selector circuit. Contacts 331 close to prepare a holding path for X delay relay 340 during pulsing. Contacts 233 close to complete an obvious circuit to light monitor lamp MON brilliantly. Contacts 232 close to prepare a path for permanent time relay 420—more will be said about this relay in the section entitled "Permanent timing." Contacts 231 close to prepare a circuit for stepping the switch in its secondary motion.

X delay relay 340 operates in parallel with release delay relay 330. Its function is to mark the end of a digit pulse train and hence the primary switch motion. The original energizing circuit may be traced from ground (+) applied over rest contacts 423 of permanent time relay 420, operated contact 321 on calling bridge relay 320, resting X off-normal contacts 301 and the upper winding of X delay relay 340 to (—) battery. X delay relay 340 operates and closes contacts 342 to prepare a self locking path for use during pulsing. Contacts 341, 245 and 244 open to prevent premature operation of hunt assist relay 350 and drive magnet Y while the XX brush passes over but does not stop on possible ground markings.

Contacts 243 open to prevent a premature switchthrough. Contacts 242 closes to apply dial tone to the calling line by way of contacts 242, 203, 272, 262, 201, the upper winding of calling bridge relay 220 and rest contacts 211 on switchthrough relay 210.

*Dialing.*—Calling subscriber A hears dial tone and proceeds to transmit a suitable number of switch directing impulses by any suitable means such as a standard telephone dial, for example.

Digit pulses are received in the form of open or break pulses in the battery supplied over the loop by calling bridge relay 220. This circuit extends from (—) battery through the lower winding of calling bridge relay 220, rest contacts 213, conductor R, pulsing contacts in the subscriber's dial, conductor T, rest contacts 211, the upper winding of calling bridge relay 220, resting overflow contacts 201, rest contacts 262, 272, resting X off-normal contacts 203 and operated contacts 242 to ground (+) which is superimposed on the dial tone signal. Responsive to each open loop pulse, calling bridge relay 220 restores to close pulsing contacts 322. Each time that contacts 321 are opened the energizing circuit for release delay relay 330 is broken; however, it continues to be held throughout pulsing due to its slow release characteristics.

A circuit is completed to drive magnet X for driving the switch one step in its primary motion responsive to each open loop pulse. This circuit may be traced from (—) battery through the winding of drive magnet X, operated contacts 342 on X delay relay 340, operated contacts 331 on release delay relay 330, resting pulsing contacts 322 on calling bridge relay 220 to ground (+) applied over rest contacts 423. Responsive to the first step taken by the switch, X off-normal contacts 203 open to remove dial tone and contacts 202 close to prepare for returning a busy tone signal. More will be said about this busy tone in the section entitled "Busy tone." Contacts 301 open to break the original operate path to X delay relay 340; however, it does not release at this time because a circuit is completed for energizing X delay relay each time that pulsing contacts 322 close. This relay continues to be held throughout pulsing due to its slow release characteristics. The circuit for energizing X delay relay 340 during pulsing may be traced from (—) battery applied through the lower winding of relay 340, operated contacts 342 on X delay relay 340, operated contacts 331 on release delay 330, resting pulsing contacts 322 on calling bridge relay 220 to ground (+) applied through rest contacts 423.

Following the last digit pulse, X delay relay 340 releases since pulsing contacts 322 are held open by calling bridge relay 220. When X delay relay 340 restores responsive to the termination of the digit pulse train, contacts 342 open so that the X delay relay may not thereafter be operated until the switch has returned to normal to close X off-normal contacts 301. Contacts 245 and 244 close to enable the XX and X conductors to control the selector switch circuit. Contacts 243 close to prepare a circuit for switchthrough relay 210; however, this circuit is not operative at this time since Y off-normal contacts 205 have not yet operated.

*M wiring.*—Since it is assumed that the switch received ten digit pulses, it was propelled to the tenth or zero level which is marked by the M conductor. A circuit is completed over the M wiring for causing the switch to operate in its secondary direction. This circuit may be traced from master ground (+) applied on operated contacts 332 of release delay relay 330, rest contacts 219 on switchthrough relay 210, rest contacts 245 on X delay relay 340, the XX conductor and brush, the M wiring, resting Y off-normal contacts 207, resting overflow contacts 204, normal Y interrupter contact 302, the upper winding and contacts 351 on hunt assist relay 350 to (—) battery via Z interrupter contacts 304. Hunt assist relay 350 operates and closes its pulsing contacts 353 thereby driving the switch one step in the secondary direction under the influence of drive magnet Y.

Magnet Y operates over a circuit which may be traced from (—) battery through the winding of magnet Y, closed pulsing contacts 353 and normal contacts 311 on switchthrough relay 210 to master ground (+) on operated contacts 332. Drive magnet Y causes the switch to take one step in its secondary direction and simultaneously therewith Y off-normal contacts 207 open. Y interrupter contacts 302 open the circuit for hunt assist relay 350; therefore, it releases and pulsing contacts 353 open to release magnet Y. The switch is standing in its first position in the secondary direction. Further operation of the switch depends upon whether brush S′ has been directed to seize a terminal which is then idle or busy.

*Busy test.*—If the trunk which has been reached by the switch responsive to its first step in the secondary direction is idle, an absence of ground is encountered by brush S′ while if the trunk is busy, a ground marking is encountered. Assuming at first that the trunk is busy, ground is returned over brush S′ to rest contacts 215 on switchthrough relay 210, operated contacts 231 on release delay relay 330, overflow contacts 204, resting Y interrupter contacts 302, the upper winding of hunt assist relay 350, contacts 351 and 304 to (—) battery. Hunt assist relay 350 operates and closes pulsing contacts 353 to drive the switch a second step in its secondary direction. The path for operating drive magnet Y may be traced from (—) battery through the winding of magnet Y, pulsing contacts 353 and contacts 311 to master ground (+) on contacts 332. Magnet Y opens contacts 302 to release the hunt assist relay which in turn opens contacts 353 to release the Y magnet. The switch is reoperated in this manner each time that a busy trunk is encountered.

If no idle trunks are found, the switch is driven into its overflow position in its secondary direction. Responsive thereto, the various contacts marked with the letters OF are operated. Contacts 200 close to extend a busy tone over the upper winding of calling bridge relay 220 and rest contacts 211 to the calling subscriber's station. Upon hearing this tone, he replaces his receiver to release the switch. Overflow contacts 204 open to prevent any further switch operation in the secondary direction.

Assuming next that an idle line is found, sleeve brush S′ is marked by an absence of ground. At this time, it might be well to note that switchthrough relay 210 is connected with brush S′ during the search for an idle trunk; however, it does not operate since it is shunted by the trunk busy ground markings. More specifically, the ground marking on conductor S′ may be traced through rest contacts 215 on switchthrough relay 210, operated contacts 231 on release delay relay 330, from the left to the right sides of the winding of switchthrough relay 210, contacts 243, 205 and 332 to master ground (+). Absence of ground on an idle trunk removes the shunting circuit applied to switchthrough relay 210. It operates over the following path: master ground (+) on operated contacts 332 of release delay relay 330, operated Y off-normal contacts 205, rest contacts 243 on X delay relay 340 through the winding of switchthrough relay 210, overflow contacts 204, Y interrupter contacts 302, the upper winding of hunt assist relay 350, contacts 351 and 304 to (—) battery. The circuit values are such that switchthrough relay 210 operates but hunt assist relay 350 does not operate in this circuit; therefore, the selector switch is cut through to zero operator position 132.

*Switchthrough.*—Responsive to the operation of switchthrough relay 210, contacts 211 and 213 are opened to release calling bridge relay 220. Contacts 212 and 214 close to connect the talking conductors through to the operator's position. Contacts 215 open to prevent any false operation of the hunt assist relay while contacts 216 close to complete continuity between incoming sleeve conductor S and outgoing sleeve conductor S'. Contacts 217 close to complete continuity between hunt sleeves HS and HS'. This conductor is used for extra supervisory features which are not material to this invention. Contacts 218 open to disable digit count relay 260. Contacts 219 open to break the XX conductor. Contacts 211*a* close and 212*a* open so that the monitor lamp MON is lit dimly as a result of the insertion of resistor R2 in the lighting path. Contacts 311 open to disable drive magnet Y. Contacts 312 open to prevent a premature release.

Responsive to the release of calling bridge relay 220, contacts 221 open to de-energize release delay relay 330 which falls. Responsive thereto, master ground (+) is removed from various other relays at contacts 332, thus assuring the release of all components which may then be operated except for switchthrough relay 210 which is held from ground returned over sleeve conductor S'.

Permanent time relay 420 is disabled at contacts 232. When the call is completed, the circuit is released as described below in the section entitled "Release."

*Call from subscriber A to subscriber C*

Next, it is assumed that subscriber A wishes to call subscriber C who is in the same office. It should be noted that the first two digits are not necessary since there is no office to select. The third digit should be effective for causing local first selector 103 to seize second selector 105, the fourth digit sets selector 105 and the last three digits cause three digit connector 106 to seize called subscriber line C. It should be further noted that subscriber C is reached by dialing the letters A and G followed by the digit 2 and any four other line selecting digits. Since letters A and G are in the finger holes on the standard dial which are also marked by the figures 2 and 4, it is seen that local selector 103 is first directed to the second level marked by a B and V wiring and second to the fourth letter marked by an A wiring. Also, it should be noted that selector 103 is provided with strap C which connects contacts 413 of second digit count relay 410 to the N wiring. Strap D is omitted. Selector 103 is seized in the manner described above under the section entitled "Seizure" and is operated in its primary direction in the manner described in the section entitled "Dialing."

*B and V wiring.*—Responsive to the first train of digit impulses, the switch is driven two steps in its primary direction to the level which is marked by the B and V wiring. When X delay relay 340 releases, a circuit is completed from the V wiring through the X brush and conductor, rest contacts 275 on digit add relay 270, rest contacts 244 on X delay relay 340, operated contacts 221 on calling bridge relay 220, rest contacts 218 on switchthrough relay 210, rest contacts 263 on digit count relay 260 and through the winding of digit count relay 260 to (—) battery. It operates and locks at its contacts 264 over a circuit which may be traced from (—) battery through the winding of digit count relay 260, operated contacts 264, X interrupter contacts 206 and in parallel therewith rest contacts 273, rest contacts 219 on switchthrough relay 210 to master ground (+) applied through operated contacts 332. Following operation of digit count relay 260, a circuit is completed over the B wiring for causing the switch to drop back to normal. This circuit may be traced from master ground (+) via the B wiring to release magnet Z, as follows: contacts 332, 219, 245, the XX conductor and brush, the B wiring, contacts 417, 362, 334, 312, 305 and through the winding of release magnet Z to (—) battery. The switch drops back and digit count relay 260 remains operated as a registration that one digit has been absorbed. Digit count relay 260 holds contacts 361 closed to prepare a path for operating second digit count relay 410. When the switch returns to normal, X off-normal contacts 301 close to complete a circuit for operating second digit count relay 410 over the path from (—) battery through the winding of digit count relay 410, rest contacts 412, operated contacts 361, resting X off-normal contacts 301, operated contacts 321 to ground (+) applied through contacts 423. Relay 410 operates and locks.

*A wiring on other than first digit.*—Next, the calling subscriber dials the second digit of the number which is the letter G or the fourth finger hole in the standard subscriber dial. Calling bridge relay 220 responds to these four pulses and causes drive magnet X to direct the switch again in its primary motion to the fourth level in the manner described above in the section entitled "Dialing." Responsive to this, the XX brush is left standing on the fourth level which is marked by the A wiring. A circuit is completed via this wiring for causing the switch to drop back a second time. This circuit may be traced from master ground (+) over operated contacts 332, rest contacts 219, rest contacts 245, the XX conductor and brush, the A wiring, operated contacts 413, the C strap, the N wiring, operated contacts 362 and 334, rest contacts 312 and operated X off-normal contacts 305 to (—) battery by way of the winding of release magnet Z. The switch drops back a second time; although, no relay operated this time, digit count relays 260 and 410 remained locked to register the fact that the switch has once operated to a level marked by a V wiring.

*B and V wiring second time.*—The switch is now prepared for the calling subscriber to transmit the third digit pulse train which is in the form of two open loop pulses since it is assumed that the call is to subscriber C who is identified by the directory number AG-2. The switch operates in the manner described above in the section entitled "Dialing." Responsive thereto, the switch is directed in the primary direction to seize the second level which is marked by a B wiring. Since second digit count relay 410 is operated, a circuit is completed via the B wiring for causing the switch to move in its secondary direction and switchthrough in the manner described above in the sections entitled "Busy test" and "Switchthrough."

The circuit for causing the switch to take its first step in the secondary direction may be traced from master ground (+) applied through operated contacts 332, rest contacts 219 on a switchthrough relay 210, rest contacts 245 on X delay relay 340, the XX conductor and wiper, the B wiring, operated contacts 416 on second digit count relay 410, Y off-normal contacts 207, resting overflow contacts 204, normal Y interrupter contacts 302, the upper winding of hunt assist relay 350, contacts 351 and Z interrupter contacts 304 to (—) battery. Hunt assist relay 350 operates and the switch is caused to search in its secondary direction for an idle trunk in the manner described above in the sections entitled "Busy test" and "Switchthrough." Conversation follows, after which the circuit is released in the manner described above in the section entitled "Release."

*Call from subscriber A to subscriber D*

It will be noted that in the case of a call to subscriber D, it is only necessary to utilize four line selecting digits. One digit operates local first selector 103 and the remaining three digits operate connector 107. Hence, the selector is expected to drop back three times and then unlock.

It is assumed that calling subscriber A proceeds to transmit the letters A and G which are the same as digits 2 and 4 respectively. Local selector 103 operates responsive to the first two digits in the manner described above in the case of a call from subscriber A to subscriber C; however, unlike the call to subscriber C, the third digit this time directs the switch to the sixth level which is marked by a Z wiring from which it drops back. Since three digit connector 107 is indicated as being connectable to any one of the ten levels on local first selector 103, it should be obvious that it is necessary to unlock the selector so that it may switchthrough responsive to the fourth digit on any level without regard to the particular wiring that may be connected to the X or XX bank.

*Z wiring.*—In greater detail, the subscriber transmits the first digit. Digit count relay 260 operates and locks; the switch drops back to normal and second digit count relay 410 operates and locks. The second digit directs the switch to a level marked by the A wiring and once again, selector 103 drops back; however, none of the relays 260, 270 or 410 are operated this time. A third digit directs the switch to the sixth level which is marked by a Z wiring. (It might be well to reiterate that in the case of first selector 103 the C strapping is used and the D strapping is omitted; hence, there is no connection between the Z wiring and contacts 413.) When the switch seizes the sixth level on the fourth digit, a circuit is completed for operating digit add relay 270. This circuit may be traced from (−) battery applied through Z interrupter contacts 304, rest contacts 372, the winding of digit add relay 270, operated contacts 265, the Z wiring, the XX brush and conductor, contacts 245, 219 and 332 to master ground (+).

Digit add relay 270 operates and locks at contacts 371 so that it may not release until switchthrough relay 210 has operated. This locking path includes contacts 371, 274, 219 and 332. Contacts 275 open so that the V wiring may not be effective thereafter. Contacts 373 close to cause the switch to drop back. The circuit for this function may be traced from ground (+) connected from the Z wiring, operated contacts 373 on digit add relay 270, operated contacts 362 on digit count relay 260, operated contacts 334 on release delay relay 330, rest contacts 312 on switchthrough relay 210, operated X off-normal contacts 305 to (−) battery through winding of release magnet Z. The switch drops back to its normal position.

Contacts 273 open one of the parallel holding paths for digit count relay 260 so that when subscriber A transmits the fourth digit, the X magnet responds to open X interrupter contacts 206 causing digit count relay 260 to release. The locking path for digit count relay 260 formerly included the following contacts: 264, 206, 219 and 332. Second digit count relay 410 does not release since its holding path is completed through contacts 411, 219 and 332.

*Unlock.*—Once digit add relay 270 operates, it makes absolutely no difference which level the switch is directed to seize on its fourth operation since it is now unlocked. For example, if the switch reaches a level responsive to movement in its primary direction which is marked by the V wiring, it is of no effect because the X conductor is now open at contacts 275. If the A marking is on the level dialed, it is of no effect because the wiring may be traced through strap C to open contacts 362 or 265 on digit count relay 260. The same is true of the N wiring. If the Z wiring is dialed, it may be traced to open contacts 265 or through contacts 373 to open contacts 362. It was noted above that the switch cuts through on the M wiring in the manner described above in the section entitled "M wiring." Therefore, if the M, Q or B wiring is on the level seized while relay 410 is operated, the switch will function to select an idle trunk. The ground for causing the switch to take its first step in the secondary direction may be traced either from the M, Q or B wiring over the following circuit: master ground (+) applied through operated contacts 332 on release delay relay 330, rest contacts 219 on switchthrough relay 210, operated contacts 274 on digit add relay 270, rest contacts 266 on digit count relay 260, rest contacts 341 on X delay relay 340, resting Y off-normal contacts 207, resting overflow contacts 204, normal Y interrupter contacts 302, through the upper winding of hunt assist relay 350, rest contacts 351 and Z interrupter contacts 304 to (−) battery.

The switch moves in the manner described above in the sections entitled "Busy test" and "Switchthrough." Conversation follows, after which the switch is released in the manner described below in the section entitled "Release."

*Call from subscriber A to subscriber E*

The next call to be described is a call which may be extended from subscriber A to subscriber E by dialing the letter H which in the case of a standard telephone dial comprises four open loop pulses because the letter H is associated with the same finger hole as the digit 4.

*Dialing A wiring first time.*—Responsive to these four open loop pulses, the switch is directed in its primary direction to the fourth level which is marked by the A wiring in the manner described above in the section entitled "Dialing." When this level is reached on the first digit (as distinguished from a digit subsequent to one marked by a V wiring) into the selector switch, a circuit is completed for causing the switch to cut through. This time the second digit count relay 410 is not operated. A circuit for causing cut through may be traced from master ground (+) applied on operated contacts 332, rest contacts 219, 245, the XX conductor and brush, the A wiring, rest contacts 414, Y off-normal contacts 207, overflow contacts 204, normal Y interrupter contacts 302, the upper winding hunt assist relay 350, contacts 351 and Z interrupter contacts 304 to (−) battery. The hunt assist relay operates and the switch proceeds in the manner described above in the sections entitled "Busy test" and "Switchthrough."

*Call from subscriber H to subscriber B*

The only difference between local first selector 153 and local first selector 103 is that in selector 153 the D strap connects contacts 413 with the Z wiring. The C strap is omitted. It should be noted that the switch does not operate differently in the case of the M wiring; therefore, when subscriber H calls subscriber B, local selector 153 operates in exactly the same manner as it did when subscriber A called subscriber B.

*Call from subscriber H to subscriber I*

To complete this call the subscriber dials the letters B and O (which causes the transmission of 2 and 4 digit pulses respectively) followed by the digit 4. Responsive to the receipt of the first digit pulse train, the switch is directed to the B and V wired level. The switch operates in the manner described above in the section entitled "B and V wiring." Digit count relay 260 operates and locks. When the switch returns to normal, second digit count relay 410 operates and locks.

*N wiring.*—The second digit pulse train directs the switch to the level marked by the N wiring. A circuit is completed through contacts 332, 219, 245, the XX conductor and N wiring, 362, 334, 312 and operated X off-normal contacts 305 to (−) battery through the winding of release magnet Z. The switch drops back and none of the relays 260, 270 or 410 are operated or restored. The chief difference between the A and N wirings is that with the C strap, the A level may be used (if it is the first digit) to cause the switch to operate in its secondary direction; whereas, when preceded by another digit marked by the V wiring, the A wiring functions in the same manner as the N conductor to cause drop-back. On the other hand, the N wiring always causes drop-back until the switch is unlocked. On the third digit pulse train the switch is directed to the A wiring and a circuit is completed from contacts 413 to connect the A wiring to the Z wiring via the D strap. The switch now operates in the manner described above in the section entitled "Z wiring." The chief difference between the Z wiring and the A wiring is that the switch may cut through on the A level the first time that it is dialed; whereas, the Z wiring can only be used as an unlocking and drop-back level. It cannot be used as a cut through level prior to an unlocking digit.

*Call from subscriber H to subscriber J*

To complete this call, subscriber H dials the letters B and A followed by five digits of any denomination. The switch is arranged to drop back responsive to the first digit pulse train and to search in its secondary direction responsive to the second digit pulse train.

Since the letters B and A on a standard telephone dial are each the same as the digit 2, it is assumed that local first selector 153 receives two successive trains of digit pulses, each of which directs the switch to a level marked by a B and V wiring. The first time, a circuit is completed from the V wiring to operate digit count relay 260. A second circuit is completed through the B wiring, contacts 417, 362, 334, 312, 305 and the winding of release magnet Z to (−) battery. This causes the release magnet to operate; following which, the switch drops back. When the switch returns to normal, X off-normal contacts 301 close to operate second digit count relay 410. The second digit directs the switch to the level marked by the B and V wiring at a time when second digit count relay 410 is operated. This time a circuit is completed for causing the switch to search in its secondary direction. This circuit may be traced from the B wiring over contacts 416, 207, 204, 302, the upper winding of hunt assist relay 350, contacts 351 and 304 to (−) battery. The switch now hunts for an idle trunk circuit.

The switch operations just described are similar to those described in connection with the call from subscriber A to subscriber C. The call to subscriber J is described merely to emphasize the manner in which the B wiring is used first to absorb a digit and second to cut through. This call is also described to show how the switch may function on a trunk call.

*Call from subscriber A or subscriber H to subscriber F*

*Q wiring*.—The last call to be described is one involving the Q wiring. The first digit pulse train to be received by the switch is the letter C, or stated otherwise, two open loop pulses. These pulses direct either of the switches 103 or 153 in a manner described above in a section entitled "Dialing." Responsive thereto, digit count relay 260 operates and locks. When the switch returns to normal, second digit count relay 410 operates and locks. The second digit pulse train comprises five open loop pulses which direct the switch to a level marked by the Q wiring. At this point the switch operates in its secondary direction and hunts for an idle trunk in the manner described above in the sections entitled "Busy test" and "Switchthrough." Since second digit count relay 410 is operated, the Q wiring in effect becomes the same as the M wiring so that the first step is taken responsive to completion of the circuit including contacts 332, 219, 245, 415, 207, 204, 302, 351 and 304 in the manner described above in the section entitled "M wiring." The chief difference between the M and the Q wiring is that the M wiring may be used at any time; whereas, the Q wiring may be used only after second digit count relay 410 has been operated.

*Release*

During a call, switchthrough relay is held over a circuit which may be traced from busy ground applied to conductor S' over operated contacts 216 on switchthrough relay 210, operated Y off-normal contacts 205, rest contacts 243, through the winding of switchthrough relay 210, resting overflow contacts 204, Y interrupter contacts 302, the upper winding of hunt assist relay 350, contacts 351 and Z interrupter contacts 304 to (−) battery. The busy ground is removed when a conversation is completed and the subscribers replace their receivers. Switchthrough relay 210 restores and reconnects calling bridge relay 220 to the preceding finder switch at contacts 211 and 213 while breaking the talking conductors at contacts 212 and 214. The remainder of the switchthrough relay contacts return to normal. The switch drop back when a circuit is completed from the release alarm conductor through rest contacts 335, 312, both the X and Y off-normal contacts 305 and 306 to (−) battery by way of the winding of release magnet Z. Z interrupter contacts 303 close to maintain a ground (+) marking via contacts 333 on sleeve conductor S until the switch is fully released. Contacts 304 open to release any equipment which may have still been operated. The switch is normal when the Z magnet releases and may be seized for the next call.

*Busy tone*

On occasions it may be that a calling subscriber makes a mistake by dialing an incorrect first digit which may not cause the switch to perform any function. For example, the first digit could direct the switch to a level indexed by the Q wiring, the N wiring, the Z wiring or no wiring, i. e., an unmarked level. If this should happen, the switch would just stand there at the end of its primary motion and it would appear that the equipment is faulty. To forestall such an event, a circuit for extending busy tone is prepared when the switch moves off-normal in its primary direction. This circuit extends as follows: operated X off-normal contacts 202, relay contacts 272, 262, overflow contacts 201, the upper winding of calling bridge relay 220 and rest contacts 211 to the calling line via tip conductor T. The calling subscriber cannot hear busy tone at this time because the dial is off-normal and the receiver shorting springs are closed. These springs are provided in the usual dial to prevent the subscriber from hearing dial clicks. If a correct digit to be absorbed is dialed, either digit count relay 260 or digit add relay 270 operates before the subscriber has had time to hear a busy signal; therefore, the path for busy tone is opened either at contacts 262 or 272. If a level is dialed from which the switch may cut through responsive to the first digit, switchthrough relay 210 operates to remove busy tone at contacts 211. Again, this happens before the calling subscriber has had an opportunity to hear the busy signal. On the other hand, if an incorrect digit is transmitted, busy tone is connected through to the calling subscriber when his dial returns to normal. He responds by replacing his receiver and reinitiating the call.

*Permanent time*

Sometimes, it may happen that the selector is seized but the call is not completed promptly. This may result from a short on the line, subscriber failure to dial, receiver being left off-hook or a stuck switch. In any event, it is desirable to avoid this condition by providing a means for releasing the switch after a predetermined time interval if the switching operation has not been completed.

When the switch is first seized, permanent time relay 420 is connected through operated contacts 232 of release delay relay 330 in the manner described above in the section entitled "Seizure." The interrupter circuit is common equipment which places periodic ground pulses on conductor TP and which places a ground interrupted by open pulses (i. e., absence of ground) on conductor H. Therefore, after a brief interval of time, permanent time relay 420 is operated via contacts 421 and 232 by the first ground pulse which appears on conductor TP. Relay 420 locks at contacts 422. At contacts 423 the solid ground marking for holding release delay relay 330 is replaced by interrupted ground applied over hold conductor H at contacts 424. Release delay relay 330 is now held over contacts 424 and 321. After another interval of time, this ground is interrupted or removed from hold conductor H and release delay relay 330 restores to open master ground (+) at contacts 332 and release the selector circuit. Hence, it is seen that the switch is released if it does not cut through before the time required for a timing pulse to appear on conductor TP and holding ground to be removed from conductor H.

*Miscellaneous*

Various elements have been shown but not described, since they have nothing to do with the invention. They are shown merely for completeness of disclosure. The circuits marked with an SP are for spark protection. They absorb sparks which might otherwise occur across pulsing contacts such as 322 and 353, for example. The lower winding of hunt assist relay 350 is non-inductive and is short circuited through its own normally closed contact 351 to reduce the resistance in series with its upper, low resistance, inductive winding to make that relay very fast to operate but having means to insert the resistance of the lower winding once the relay is operated to reduce the relatively large current required for quick operation. The monitor and test jacks and busy key are for the benefit of maintenance personnel and are used when testing the selector.

The appended claims are designed to cover not only the specific embodiment shown in the drawing but also such modifications as may be within the scope of my invention.

What I claim is:

1. In a telephone system, a local first selector comprising a switch including a first set of brushes carrying talking conductors, a plurality of contacts terminating in a bank arranged in ten levels of ten contacts each accessible to said brushes, auxiliary brushes and a bank of auxiliary contacts, each of said auxiliary contacts corresponding to one of said levels, means for selectively marking said auxiliary contacts according to desired switch operations, means for simultaneously driving said first set of brushes in a primary direction and said auxiliary brushes to one of said auxiliary level contacts under the influence of a digit pulse train, means responsive to said auxiliary brush making connection with a contact having one of said markings for causing said switch to drop back to normal when driven to a predetermined level upon receipt in said selector of a first digit pulse train, means also responsive to said auxiliary brush making connection with a contact having said one marking for causing said selector to operate in its secondary direction when driven to said predetermined level responsive to the receipt in said selector of any except said first digit pulse train, means responsive to said auxiliary brush making connection with a contact having another of said markings for causing said switch to operate in its secondary direction when driven to another of said levels responsive to the first digit pulse train received by said selector, and means also responsive to said auxiliary brush making connection with said contact having said other marking for causing said switch to drop back when driven to said other level responsive to a digit pulse train which is other than the first digit pulse train that may be received by said selector during any given call.

2. In a telephone system, a local first selector comprising a switch including a first set of brushes carrying talking conductors, a plurality of contacts terminating in a bank arranged in ten levels each accessible to said brushes, auxiliary brushes and a bank of auxiliary contacts, each of said auxiliary contacts corresponding to one of said levels, means for selectively marking said auxiliary contacts according to desired switch operations, means for simultaneously driving said first set of brushes in a primary direction and said auxiliary brushes to one of said auxiliary level contacts under the influence of a digit pulse train, means responsive to said auxiliary brush making connection with a contact having one of said markings corresponding to a particular level for causing said switch to operate in its secondary direction when said switch is driven to said particular level upon receipt in said selector of a first digit pulse train in any given call, and means responsive to said auxiliary brush making connection with a contact having said one marking for causing said switch to drop back to normal from said particular level when said switch is driven to said particular level upon receipt in said selector of any except the first digit pulse train in a given call.

3. A two motion selector comprising a switch and a plurality of contacts arranged in levels, an auxiliary bank of contacts having a contact individual to each of said levels, means for selectively marking said individual contacts, means for moving said switch in the first of its two motions to select one of said levels under the influence of a first train of digit pulses, a first digit count relay, means responsive to said auxiliary brush making connection with a contact having one of said markings corresponding to said one level for causing said first digit count relay to operate and said switch to drop back to normal, a second digit count relay, means jointly responsive to operation of said first digit count relay and said drop-back for operating said second digit count relay, means for reoperating said switch to said one level a second time, means responsive to said auxiliary brush making connection with a contact having said marking and said second digit count relay on said reoperation of said switch for causing said switch to move in its secondary direction in search of said idle equipment, means responsive to said auxiliary brush making connection with a contact having another of said markings for causing said switch to operate in its secondary direction when driven to another of said levels responsive to receipt of a first digit pulse train in said selector, and means also responsive to said auxiliary brush making connection with a contact having said other marking for causing said switch to drop back when operated responsive to receipt of a digit pulse train which is other than the first digit pulse train to be received by said selector.

4. A two motion selector comprising a switch for use in a telephone system comprising; a plurality of contacts arranged in levels, an auxiliary bank of contacts, one individual to each of said levels, means responsive to an incoming digit pulse train for causing said switch to move in its primary direction to one of said levels, means for marking said auxiliary contacts according to desired switch operations, means for causing said switch either to drop back or to operate in its secondary direction responsive to completion of circuits through said marking on said one level, and means responsive to the position of said digit pulse train in a series of digit pulse trains for selecting between said drop-back and said secondary operations.

5. The selector of claim 4 wherein said last named means comprises circuit means for extending said marking to cause said switch to hunt in its secondary direction, means including at least a digit count relay, means responsive to a primary switch motion to other than said one level for causing said digit count relay to operate and for causing said switch to drop back to normal, and means jointly responsive to said digit count relay and to completion of circuits for said markings for breaking said circuit means and for causing said switch to drop back to normal a second time.

6. A selector comprising a two-motion switch having a first set of brushes carrying talking conductors, a plurality of contacts accessible to said brushes and terminating in a bank arranged in levels, certain of said levels being initially barred against access by said switch, auxiliary brushes and a bank of auxiliary contacts, each of said auxiliary contacts corresponding to one of said levels, means for selectively marking said auxiliary contacts according to desired switch operations, means for driving said first set of brushes in a primary direction and simultaneously therewith driving said auxiliary brushes to one of said auxiliary level contacts under the influence of a digit pulse train, first circuit means connected to one of said auxiliary bank contacts corresponding to a particular level for causing said switch to operate in its secondary direction when directed to said particular level responsive to the first digit pulse train received by said selector, second circuit means for causing said selector to drop back, third circuit means for causing said selector to drop back and to prepare said switch to gain access to at least some of said barred levels, other circuit means for disconnecting said first circuit means from said auxiliary contact corresponding to said particular level and for substituting therefor either said second or said third circut means, means whereby said other circuit means is made effective when said switch is driven to said particular level responsive to a digit pulse train which is other than the first digit pulse train received by said selector whereby said switch drops back each time that said switch is directed to said particular level responsive to a digit pulse train other than the first digit pulse train received by said selector when said other circuit means interconnects said first and said second circuit means, but said switch drops back and prepares to gain access to at least some of said barred levels the first time that said switch is operated to said particular level responsive to a digit pulse train which is other than the first digit pulse train received by said selector when said other circuit means interconnects said first and said third circuit means, so that said switch is operated in its secondary direction responsive to another digit pulse train which is received after said preparation to gain access without regard to the number of digit pulses that may be the other pulse train.

7. A two-motion telephone selector switch comprising a plurality of brushes carrying talking conductors, a bank of terminal contacts accessible to said brushes and arranged in groups, auxiliary brushes and a bank of auxiliary contacts, each of said auxiliary contacts corresponding to one of said groups of terminal contacts, means for selectively marking said auxiliary contacts to identify particular ones of said groups of terminal contacts, means for driving said set of brushes in a primary direction to select one of said groups and simultaneously therewith for driving said auxiliary brushes to one of said auxiliary contacts corresponding to said one group under the influence of a digit pulse train, first circuit means for marking a particular one of said auxiliary bank contacts to cause said switch to operate in its secondary direction if said marking is encountered responsive to the first primary operation of said switch in any given call, second circuit means for marking another of said auxiliary contacts for causing said switch to drop back if directed to another of said groups corresponding to said other auxiliary contact, means responsive to operation of said switch to one of said auxiliary contacts other than said particular contact for disconnecting said first circuit means and for substituting therefor said second circuit means whereby said switch is caused to drop back if thereafter directed to said particular group.

8. A two-motion telephone selector switch comprising a plurality of bruhes carrying talking conductors, a bank of terminal contacts accessible to said brushes and arranged in groups, auxiliary brushes and a bank of auxiliary contacts, each of said auxiliary contacts corresponding to one of said groups of terminal contacts, means for selectively marking said auxiliary contacts to identify particular ones of said groups of terminal contacts, means for driving said set of brushes in a primary direction to select one of said groups and simultaneously therewith for driving said auxiliary brushes to one of said auxiliary contacts corresponding to said one group under the influence of a digit pulse train, first circuit means for marking a particular one of said auxiliary bank contacts to cause said switch to operate in its secondary direction if said marking is encountered responsive to the first primary operation of said switch in any given call, second circuit means for marking another of said auxiliary contacts for causing said switch to drop back if directed to another of said groups corresponding to said other auxiliary contacts, a first relay operated responsive to said switch encountering said second circuit means during the establishment of a particular call, a second relay, means responsive jointly to said drop-back and to operation of said first relay for operating said second relay, means responsive to the operation of said second relay for disconnecting said first circuit means from said particular auxiliary contact and for substituting therefor said second circuit means, a third relay, means responsive to a subsequent primary switch motion during the establishment of said particular call for driving said auxilary brushes to said particular auxiliary contact for causing said switch to drop back and for operating said third relay, and means responsive to operation of said third relay for unlocking said switch.

References Cited in the file of this patent

UNITED STATES PATENTS

| | | |
|---|---|---|
| 2,513,400 | Carson et al. | July 4, 1950 |
| 2,578,071 | Jones et al. | Dec. 11, 1951 |
| 2,642,498 | Riddell et al. | June 16, 1953 |